(12) United States Patent
Foo et al.

(10) Patent No.: US 7,744,123 B2
(45) Date of Patent: Jun. 29, 2010

(54) METHOD AND APPARATUS FOR CONTROLLING AN ACTUATABLE RESTRAINING DEVICE USING XY SIDE SATELLITE ACCELEROMETERS

(75) Inventors: Chek-Peng Foo, Ann Arbor, MI (US); Huahn-Fern Yeh, Novi, MI (US); Carl A. Munch, Troy, MI (US); Kevin Daniel Weiss, Farmington Hills, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 899 days.

(21) Appl. No.: 11/416,675

(22) Filed: May 3, 2006

(65) Prior Publication Data

US 2006/0255575 A1 Nov. 16, 2006

Related U.S. Application Data

(60) Provisional application No. 60/679,514, filed on May 10, 2005.

(51) Int. Cl.
*B60R 21/16* (2006.01)

(52) U.S. Cl. ............... 280/735; 180/274; 180/282; 701/45

(58) Field of Classification Search ............ 180/274, 180/282; 280/735; 701/45
See application file for complete search history.

(56) References Cited

U.S. PATENT DOCUMENTS

| 5,935,182 | A | 8/1999 | Foo et al. | |
|---|---|---|---|---|
| 6,036,225 | A | 3/2000 | Foo et al. | |
| 6,170,864 | B1* | 1/2001 | Fujita et al. | 280/735 |
| 6,186,539 | B1 | 2/2001 | Foo et al. | |
| 6,282,474 | B1 | 8/2001 | Chou et al. | |
| 6,453,224 | B1* | 9/2002 | Caruso et al. | 701/45 |
| 6,529,810 | B2 | 3/2003 | Foo et al. | |
| 6,594,570 | B2* | 7/2003 | Nagao et al. | 701/45 |
| 6,615,122 | B1* | 9/2003 | Yamashita | 701/45 |
| 6,644,688 | B1* | 11/2003 | Hu et al. | 280/735 |
| 6,776,435 | B2 | 8/2004 | Foo et al. | |
| 6,892,122 | B2* | 5/2005 | Miyata et al. | 701/45 |

(Continued)

FOREIGN PATENT DOCUMENTS

DE 100 84 602 B4 4/2002

(Continued)

OTHER PUBLICATIONS

U.S. Foo et al. U.S. Appl. No. 11/416,674, filed May 3, 2006 entitled "Method and Apparatus for Controlling an Actuatable Restraining Device Using XY Crush-Zone Satellite Accelerometers,".

*Primary Examiner*—Toan C To
(74) *Attorney, Agent, or Firm*—Tarolli, Sundheim, Covell & Tummino LLP

(57) ABSTRACT

An apparatus is provided for controlling a vehicle actuatable occupant restraining system. A central crash accelerometer senses crash acceleration at a central vehicle location provides a first crash acceleration signal. A side-satellite accelerometer senses crash acceleration substantially parallel with a front-to-rear axis of the vehicle and provides a signal indicative thereof. A controller actuates the actuatable occupant restraining system in response to the central crash acceleration signal and the side-satellite signal.

15 Claims, 5 Drawing Sheets

U.S. PATENT DOCUMENTS

| | | | |
|---|---|---|---|
| 6,898,498 B1 * | 5/2005 | Wessels et al. | 701/45 |
| 6,944,525 B2 * | 9/2005 | Miyata et al. | 701/45 |
| 6,961,645 B2 * | 11/2005 | Andres et al. | 701/45 |
| 7,121,376 B2 * | 10/2006 | Baumgartner et al. | 180/282 |
| 7,203,584 B2 * | 4/2007 | Andres et al. | 701/45 |
| 7,224,263 B2 * | 5/2007 | Maehara | 340/429 |
| 7,286,920 B2 * | 10/2007 | Ide | 701/45 |
| 7,346,441 B2 * | 3/2008 | Ide et al. | 701/45 |

FOREIGN PATENT DOCUMENTS

WO    WO 2005/014343 A1    2/2005

* cited by examiner

METHOD AND APPARATUS FOR CONTROLLING AN ACTUATABLE RESTRAINING DEVICE USING XY SIDE SATELLITE ACCELEROMETERS

RELATED APPLICATION

This application claims the benefit of U.S. Provisional Application No. 60/679,514, which was filed on May 10, 2005.

FIELD OF THE INVENTION

The present invention relates to a method and apparatus for controlling a vehicle actuatable occupant restraining device. In particular, the arrangement in accordance with the present invention, permits enhanced detection of offset deformable barrier crash events.

BACKGROUND OF THE INVENTION

Air bag restraining systems in vehicles for vehicle occupants are known in the art. An air bag restraining device may include a multistage inflator where the stages are actuated at different times in response to vehicle crash conditions.

U.S. Pat. No. 5,935,182 to Foo et al., assigned to TRW Inc., discloses a method and apparatus for discriminating a vehicle crash condition using virtual sensing. U.S. Pat. No. 6,036,225 to Foo et al., assigned to TRW Inc., discloses a method and apparatus for controlling a multistage actuatable restraining system in a vehicle using crash severity index values. U.S. Pat. No. 6,186,539 to Foo et al., also assigned to TRW Inc., discloses a method and apparatus for controlling a multistage actuatable restraining device using crash severity indexing and crush-zone sensors. U.S. Pat. No. 6,529,810 to Foo et al., also assigned to TRW Inc., discloses a method and apparatus for controlling an actuatable multistage restraining device using several thresholds based on transverse acceleration.

SUMMARY OF THE INVENTION

The present invention is directed to a method and apparatus for controlling a vehicle multistage actuatable occupant restraining system using XY side satellite accelerometers.

An apparatus is provided for controlling a vehicle actuatable occupant restraining system comprising a central crash accelerometer sensing crash acceleration at a central vehicle location and providing a first crash acceleration signal indicative thereof. A side-satellite accelerometer senses crash acceleration substantially parallel with a front-to-rear axis of the vehicle and provides a signal indicative thereof. The apparatus further includes a controller actuating the actuatable occupant restraining system in response to the central crash acceleration signal and the side-satellite signal.

In accordance with another feature of the present invention, an apparatus is provided for controlling a vehicle actuatable occupant restraining system comprising a central crash accelerometer sensing crash acceleration at a central vehicle location and providing a first crash acceleration signal indicative thereof and a XY side-satellite accelerometer mounted in a side structure of the vehicle for sensing crash accelerations and for providing signals indicative thereof. A controller is provided for actuating the actuatable occupant restraining system in response to the central crash acceleration signal and the XY side-satellite signals.

In accordance with yet another aspect of the present invention, a method is provided for controlling a vehicle actuatable occupant restraining system comprising the steps of sensing forward crash acceleration at a central vehicle location, sensing forward crash acceleration at a side location of the vehicle, and actuating the actuatable occupant restraining system in response to the sensed central crash acceleration and the sensed forward crash acceleration at the side location.

BRIEF DESCRIPTION OF THE DRAWINGS

The foregoing and other features and advantages of the invention will become apparent to one skilled in the art upon consideration of the following description of the invention and the accompanying drawings in which.

DETAILED DESCRIPTION

Figure 1:
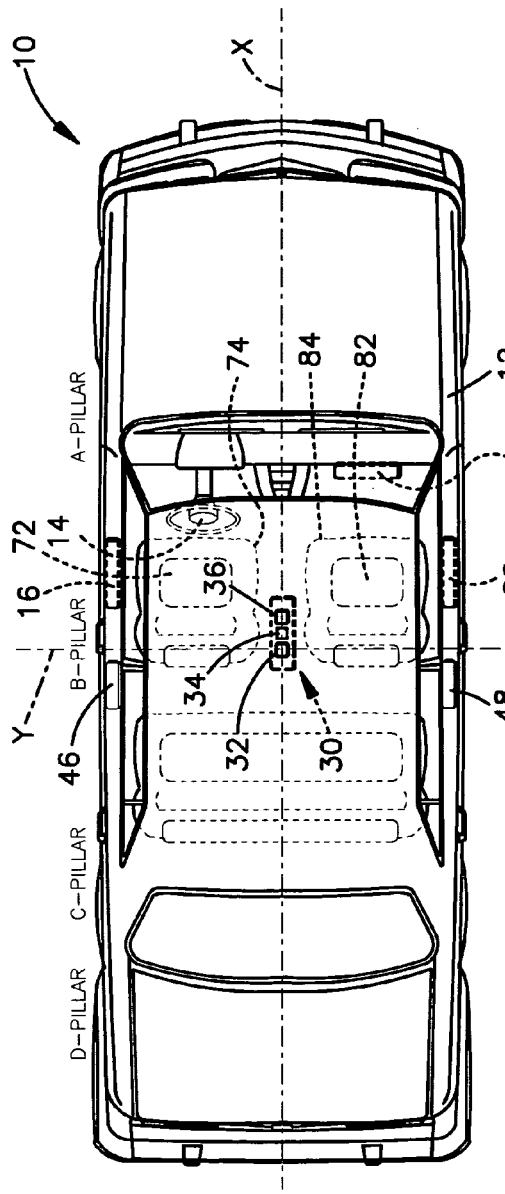
FIG. 1 is a schematic diagram of a vehicle having an actuatable occupant restraining system with a control arrangement in accordance with one exemplary embodiment of the present invention.
Figure 2:
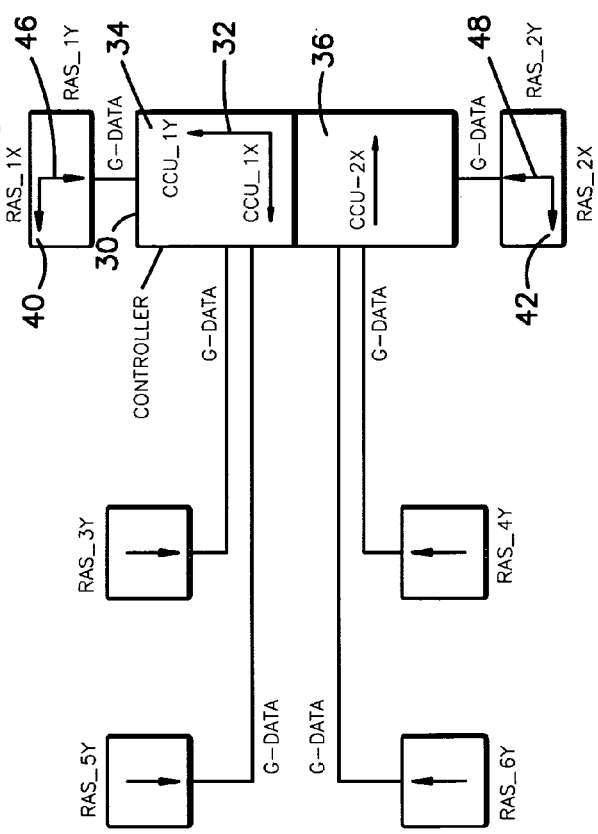
FIG. 2 is a schematic block diagram of the actuatable occupant restraining system shown in FIG. 1 showing the crash sensing accelerometers in more detail.
Figure 3:
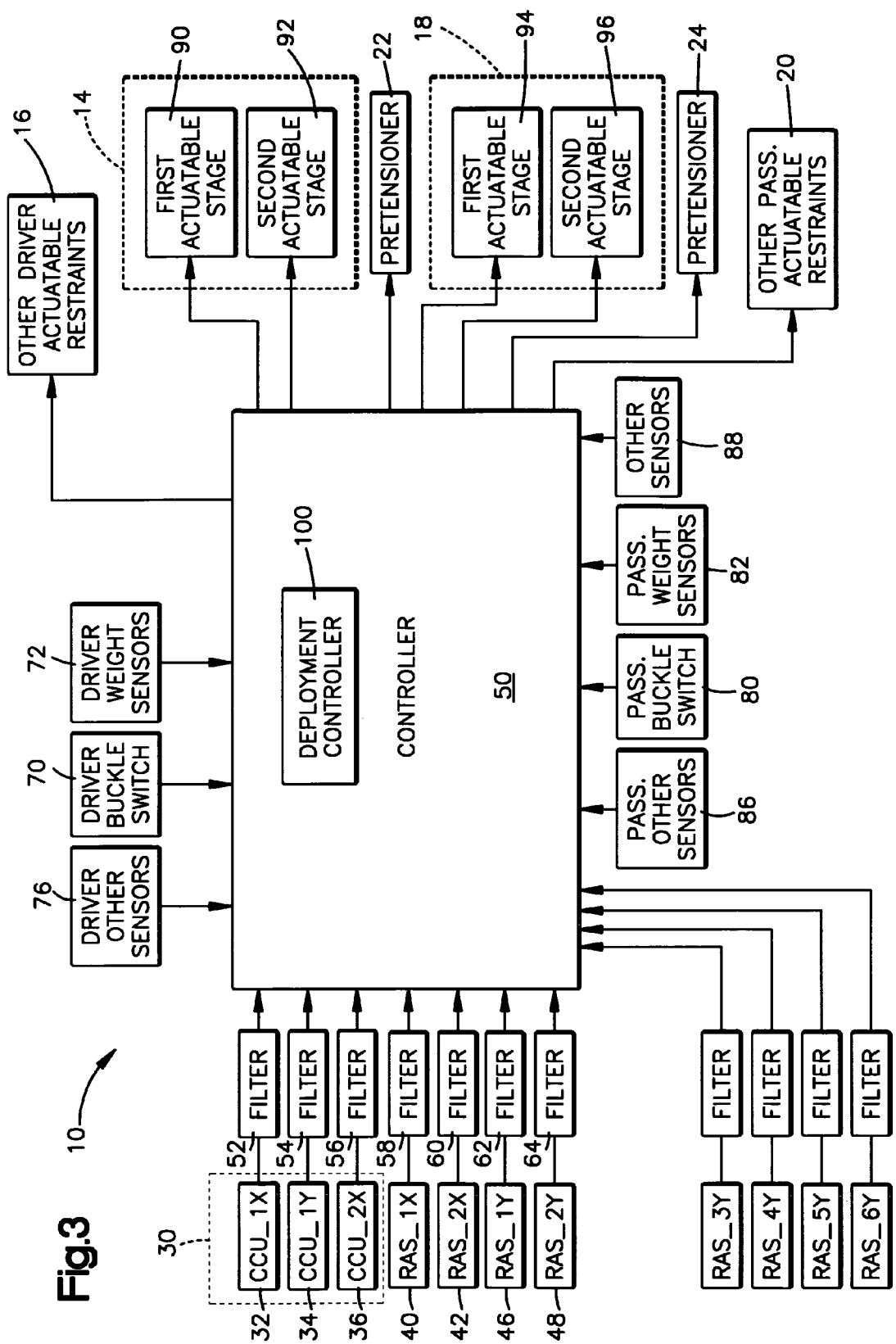
FIG. 3 is an electrical schematic block diagram of the actuatable occupant restraining system shown in FIG. 1.

Referring to FIGS. 1-3, an actuatable occupant restraining system 10, in accordance with the present invention, in a vehicle 12, includes a driver's side, multistage, front actuatable restraining device 14, and a passenger's side, multistage, front actuatable restraining device 18. Other actuatable restraining devices could be included such as a driver's actuatable side restraining device 16 and a passenger's actuatable side restraining device 20. The actuatable occupant restraining system 10 could further include a driver's side pretensioner 22, and a passenger's side pretensioner 24. The present invention is not limited to use with an air bag restraining system. The present invention is applicable to any actuatable restraining device having multiple actuatable stages or to a plurality of actuatable restraining devices that can be simultaneously or sequentially actuated. A front air bag having plural actuatable stages is described for purposes of explanation. The invention is also applicable to a vehicle having multiple air bags wherein at least one of the air bags is a multistage air bag controlled in accordance with the present invention.

The system 10 includes at least one crash or collision sensor assembly 30 located at a substantially central location of the vehicle. Preferably, sensor assembly 30 includes a first crash acceleration sensor 32 having its axis of sensitivity substantially oriented to sense crash acceleration in the vehicle X-direction (i.e., parallel with the front-to-rear axis of the vehicle) that provides a crash acceleration signal designated CCU_1X. The sensor assembly 30 further includes a second crash acceleration sensor 34 having its axis of sensitivity substantially oriented to sense crash acceleration in the vehicle Y-direction (i.e., perpendicular to the front-to-rear axis of the vehicle) that provides a transverse crash acceleration signal designated CCU_1Y. The sensor assembly 30 further includes a third crash acceleration sensor 36 having its axis of sensitivity substantially oriented to sense crash acceleration in the vehicle X-direction (i.e., parallel with the front-to-rear axis of the vehicle) that provides a crash acceleration signal designated CCU_2X.

The crash acceleration signals from the crash sensors 32, 34, 36 can take any of several forms. Each of the crash acceleration signals can have amplitude, frequency, pulse duration, etc., or any other electrical characteristics that vary as a function of the sensed crash acceleration. In accordance with an example embodiment, the crash acceleration signals have frequency and amplitude characteristics indicative of the sensed crash acceleration.

A driver's side-satellite crash acceleration sensor 40, 46 is mounted on the driver's side of the vehicle such as at the B-pillar. The side-satellite crash acceleration sensor 40 has an axis of sensitivity substantially oriented to sense crash acceleration parallel with the vehicle's X-axis and provides a signal designed RAS_1X. The side-satellite crash acceleration sensor 46 has an axis of sensitivity substantially oriented to sense crash acceleration parallel with the vehicle's Y-axis and provides a signal designated as RAS_1Y. The signals RAS_1X and RAS_1Y have frequency and amplitude characteristics indicative of crash acceleration in the X-axis and Y-axis directions, respectively. A passenger's side-satellite crash acceleration sensor 42, 48 is mounted on the passenger's side of the vehicle such as at the B-pillar. The side-satellite crash acceleration sensor 42 has an axis of sensitivity substantially oriented to sense crash acceleration parallel with the vehicle's X-axis and provides a signal designed RAS_2X. The side-satellite crash acceleration sensor 48 is oriented to sense crash acceleration parallel with the vehicle's Y-axis and provides a crash acceleration signal designated as RAS_2Y. The signals RAS_2X and RAS_2Y have frequency and amplitude characteristics indicative of crash acceleration in the X-axis direction and the Y-axis direction, respectively. Other Y-axis satellite accelerations sensors may be mounted in the C-pillars on each side of the vehicle and the D-pillars on each side of the vehicle. If C-pillar and D-pillar acceleration sensors are used, they provide acceleration signals designated as RAS_3Y (Driver's side C-pillar), RAS_4Y (Passenger's side C-pillar), RAS_5Y (Driver's side D-pillar), and RAS_6Y (Passenger's side D-pillar). For the purposes of explanation of the present invention, it is assumed that only B-pillar side-satellite XY sensors are present.

The crash acceleration signals CCU_1X, CCU_1Y, RAS_1X, RAS_1Y, RAS_2X and RAS_2Y are provided to a controller 50, through associated hardware high pass/low pass filters 52, 54, 58, 62, 60, and 64, respectively. The controller 50 is preferably a microcomputer. Although the example embodiment of the invention uses a microcomputer, the invention is not limited to the use of a microcomputer. The present invention contemplates that the functions performed by the microcomputer could be carried out by other digital and/or analog circuitry and can be assembled on one or more circuit boards or as an application specific integrated circuit ("ASIC").

The filters 52, 54, 56, 58, 62, 60, and 64, filter the crash acceleration signals to remove frequency components that are not useful in discriminating a vehicle crash event, e.g., frequency components resulting from road noise. Frequencies useful for crash discrimination can be determined through empirical testing of a vehicle platform of interest.

The controller 50 monitors the filtered crash acceleration signals and performs one or more crash algorithms to discriminate whether a vehicle deployment or non-deployment crash event is occurring. Each crash algorithm measures and/or determines values of the crash event from the crash acceleration signals. These values are used in deployment and actuation decisions. Such measured and/or determined crash values are also referred to as "crash metrics" and include crash acceleration, crash energy, crash velocity, crash displacement, crash jerk, etc. Based upon the crash acceleration signals, the controller 50 controls the multistage actuatable restraining devices 14, 18. The controller 50 may also monitor the CCU_2X signal via filter 56.

Other driver associated sensors are used to detect characteristics of the driver that are or could be used by the controller 50 in its control algorithm to control the actuatable restraining devices 14 and 16. These sensors include a driver's buckle switch sensor 70 that provides a signal to controller 50 indicating whether the driver has his seat belt buckled. Driver's weight sensors 72 located in the driver's seat 74 provide a signal indicative of the driver's sensed weight. Other driver associated sensors 76 provide other driver related information to the controller 50 such as position, height, girth, movement, etc.

Other passenger associated sensors are used to detect characteristics of the passenger that are or could be used by the controller 50 in its control algorithm to control the actuatable restraining devices 18 and 20. These sensors include a passenger's buckle switch sensor 80 that provides a signal to controller 50 indicating whether the passenger has his seat belt buckled. Passenger's weight sensors 82 located in the passenger's seat 84 provide a signal indicative of the passenger's sensed weight. Other passenger associated sensors 86 provide other occupant information to the controller 50 related to the passenger such as position, height, girth, movement, etc. Other sensors 88 provide signals to the controller 50 indicative of whether a passenger is present on the seat 84, whether a child restraining seat is present on the seat 84, etc.

In an exemplary embodiment, the air bag restraining device 14 includes a first actuatable stage 90 and a second actuatable stage 92, e.g., two separate sources of inflation fluid in fluid communication with a single air bag restraining device 14. Each stage 90, 92, has an associated squib (not shown) that, when energized with sufficient current for a sufficient time period, initiates fluid flow from an associated fluid source. When one stage is actuated, a percentage less than 100% of the maximum possible inflation occurs. To achieve 100% inflation, the second stage must be actuated within a predetermined time of the first stage actuation. More specifically, the controller 50 performs a crash algorithm using determined crash metrics and outputs one or more signals to the actuatable restraining device 14 for effecting actuation of one or both actuatable inflation stages 90 and 92 at times to achieve a desired inflation profile and pressure. As mentioned, other actuatable restraining devices such as a pretensioner 22, or other devices such as side restraining devices 16 would be controlled in accordance with the present invention.

As mentioned, each of the actuatable stages 90, 92 includes an associated squib (not shown) of the type well known in the art. Each squib is operatively connected to an associated source of gas generating material and/or a bottle of pressurized gas. The squibs are ignited by passing a predetermined amount of electrical current through them for a predetermined time period. Each squib ignites its associated gas generating material and/or pierces its associated pressurized gas bottle. The amount of gas released into the bag is a direct function of the number of stages actuated and the timing of their actuation. The more stages actuated during predetermined time periods, the more gas present in the air bag. In accordance with an exemplary embodiment, the air bag restraining device 14 includes two actuatable stages. If only one stage is actuated, 40% of the maximum possible inflation pressure occurs. If the two stages are actuated within 5 msec. of each other, 100% of the maximum possible inflation pressure occurs. If the stages are actuated approximately 20 msec. apart, a different, lesser percentage of the maximum possible inflation occurs. By controlling the actuation timing of the multiple stages, the dynamic profile of the bag is controlled, e.g., the inflation rate, the inflation pressure, etc.

The passenger's side restraining device 18 includes a first actuatable stage 94 and a second actuatable stage 96 controlled as described above with regard to the driver's side restraining device 14 to control the percentage of maximum possible inflation pressure of the air bag.

In accordance with the present invention, a deployment controller 100 within the controller 50 controls the actuation of the first actuatable stages 90, 94 and second actuatable stages 92, 96 using determined crash metrics and other monitored sensor inputs.

Figure 4:
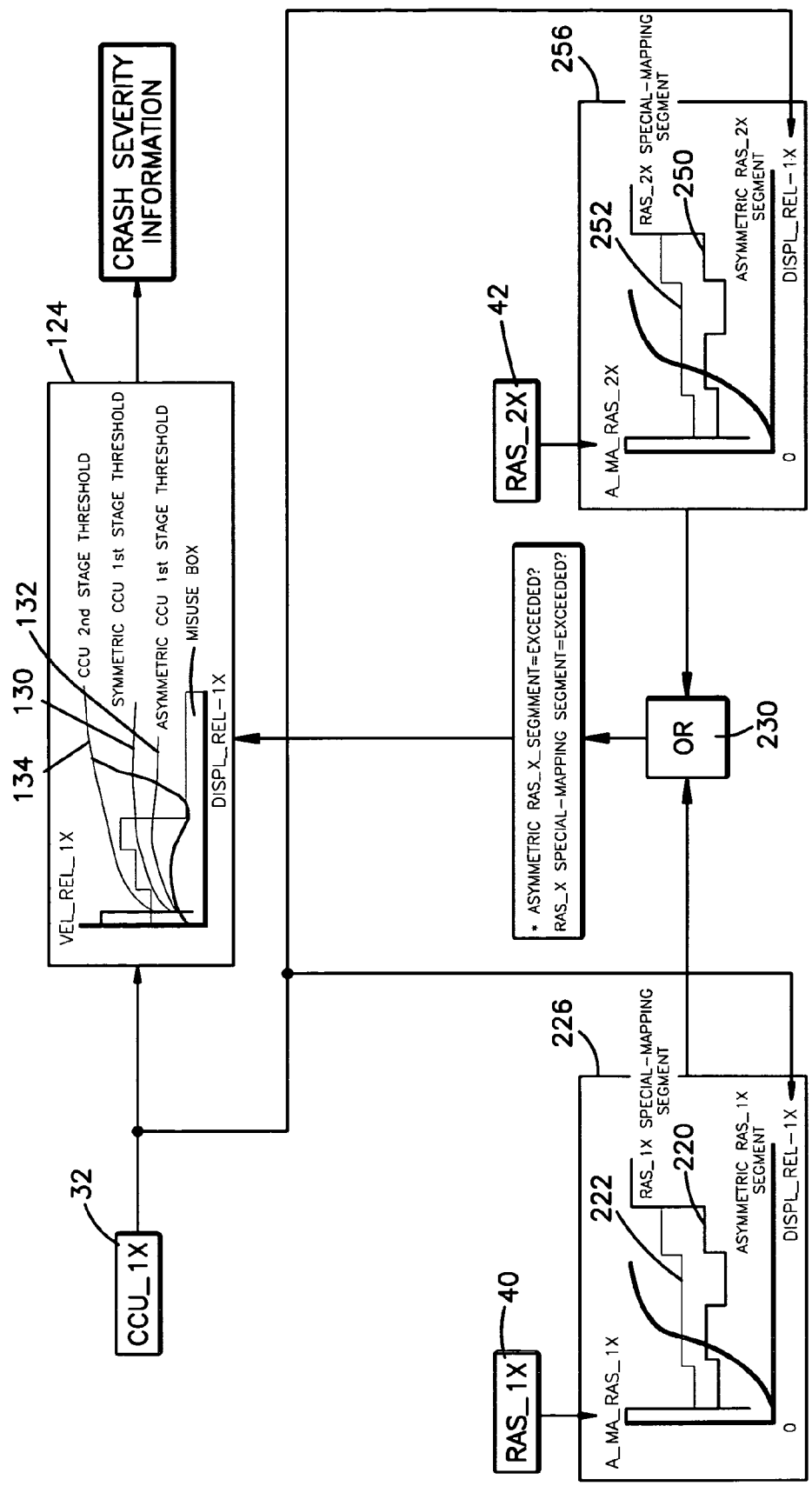
FIG. 4 shows graphical representations of determined crash related values and thresholds used in the control arrangement of the present invention.
Figure 5:
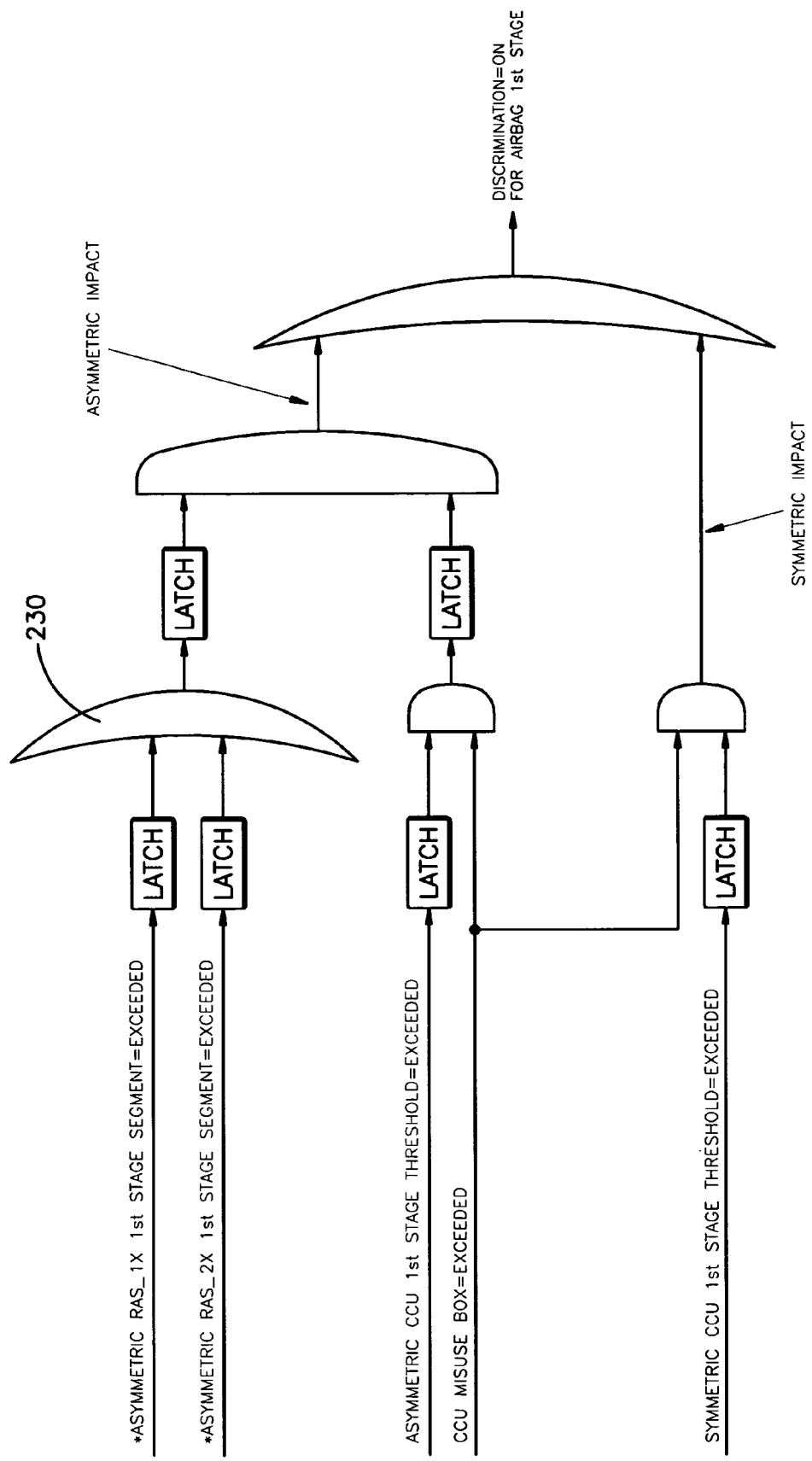
FIG. 5 is a logic diagram showing the deployment control logic using the XY side satellite accelerometers in accordance with the present invention.

Referring to FIGS. 4 and 5, the control process performed by the controller 50 to control the first and second stages will be better understood for the driver's side, multistage restraining device 14. It should be understood that the passenger's side, multistage restraining device 18 is similarly controlled with differences noted below. As mentioned, the controller 50 is, in accordance with an exemplary embodiment, a microcomputer programmed to perform these illustrated functions.

The acceleration sensor 32, an accelerometer in an exemplary embodiment, outputs an acceleration signal CCU_1X having a characteristic (e.g., frequency and amplitude) indicative of the vehicle's crash acceleration upon the occurrence of a crash event. The acceleration signal CCU_1X is filtered by, preferably, a hardware (i.e., separate from the controller 50) high-pass-filter ("HPF")/low-pass-filter ("LPF") 52 to eliminate frequencies resulting from extraneous vehicle operating events and/or input signals resulting from road noise. The frequency components removed through filtering are not indicative of the occurrence of a crash event for which deployment of the restraining device 14 is desired. Empirical testing is used to determine the frequency values of relevant crash signals for a particular vehicle platform of interest. Extraneous signal components that may be present in the crash acceleration signal are appropriately filtered and signal characteristics indicative of a deployment crash event are passed for further processing.

The accelerometer 32, in accordance with an exemplary embodiment, has a nominal sensitivity of ±100 g's (g being the value of acceleration due to earth's gravity, i.e., 32 feet per second squared or 9.8 m/s$^2$). In a multistage actuatable restraining system, it is desirable to continue sensing crash acceleration during the crash event, even after a first or initial trigger threshold is reached. Since a first stage actuation is desired upon the occurrence of crash acceleration well within ±100 g's, the further need for sensing is facilitated with the accelerometer 32 having a nominal sensitivity of ±100 g's.

The filtered output signal is provided to an analog-to-digital (converter), which is preferably internal to the controller 50 (e.g., an A/D input of a microcomputer) or an external AND converter. The A/D converter converts the filtered crash acceleration signal into a digital signal. The output of the A/D converter is filtered preferably with another high-pass/low-pass filter having filter values empirically determined for the purpose of eliminating small drifts and offsets associated with the A/D conversion. In a microcomputer embodiment of the present invention, the filter would be digitally implemented within the microcomputer. A determination function of the controller 50 determines two crash metric values Vel_Rel_1X ("crash velocity") and Displ_Rel_1X ("crash displacement") from the filtered crash acceleration signal CCU_1X. This is done by first and second integrations of the acceleration signal from CCU_1X.

The crash displacement value and crash velocity value are preferably determined using a virtual crash sensing process fully described in U.S. Pat. No. 6,186,539 to Foo et al. and U.S. Pat. No. 6,036,225 to Foo et al. using a spring mass model of the occupant to account for spring forces and damping forces. A detailed explanation of a spring-mass model is found in U.S. Pat. No. 5,935,182 to Foo et al.

The values determined in velocity and displacement determination function are used to compare the Vel_Rel_1X value as a function of Displ_Rel_1X against crash displacement varying thresholds in a comparison function of the controller 50. The comparison function 124 compares the Vel_Rel_1X value against a LOW threshold 130 or a SWITCHED LOW threshold 132 and also compares the Vel_Rel_1X value against a HIGH threshold 134. Which of the two low thresholds 130 and 132 are selected for control of the deployment of the first stage actuation 90 of the restraining device 14 is controlled in response to determined RAS_1X and RAX_2X values compared against associated threshold values referred to herein as asymmetric RAS_1X segment values and asymmetric RAS_2X segment values, respectively, both of which vary as a function of the Displ_Rel_1X value as discussed below. It is desirable to, according to the present invention, deploy the first stage 90 when the Vel_Rel_1X exceeds the LOW threshold 130 or the SWITCHED LOW threshold 132 (depending on which is used by controller 50 as described below). The second stage 92 is actuated as a function of the time between a LOW (or SWITCHED LOW) threshold crossing and a HIGH threshold crossing and in accordance with a predetermined mapping function. All three thresholds 130, 132, and 134 vary as a function of the crash displacement Displ_Rel_1X value and are empirically determined for a particular vehicle platform of interest.

The controller 50 determines the time period from when the determined crash velocity value Vel_Rel_1X exceeds the LOW threshold 130 or the SWITCHED LOW threshold 132 to when it exceeds the HIGH threshold 134. This time period is referred to herein as the "At measurement". This value is a measure of the crash intensity. The shorter the time period, the more intense the vehicle crash. It is this measure of At that is used in the control actuation of the second stage 92. The second stage is not necessarily deployed at the time of the HIGH threshold crossing, but as a function of the At measurement in accordance with a mapping function as described below.

If the RAS_1X and RAS_2X sensors 40 and 42 detected certain crash events, the LOW threshold 130 is switched from the LOW threshold value 130 to the SWITCHED LOW threshold 132 to control the deployment of the first stage 90 and for the determination of the At measurement which is, in turn, used to control actuation of the second stage 92.

The side-satellite sensors 40, 46 may be a single XY accelerometer assembly providing signals RAS_1X and RAS_1Y having characteristics (e.g., frequency and amplitude) indicative of the vehicle's crash acceleration upon the occurrence of a crash event. The acceleration signal RAS_1X is filtered by, preferably, a hardware high-pass-filter ("HPF")/low-pass-filter ("LPF") 58 to eliminate frequencies resulting from extraneous vehicle operating events and/or inputs resulting from road noise. The frequency components removed through filtering are those frequencies not indicative of the occurrence of a crash event. Similarly, RAS_1Y is filter by HPF 62. Empirical testing is used to establish a frequency range or ranges of the relevant crash signals so that extraneous signal components present in the crash acceleration signal can be filtered and frequencies indicative of a crash event passed for further processing.

The filtered output signals are provided to associated analog-to-digital ("AND") converters that may be internal to the controller 50 (e.g., an A/D input of a microcomputer) or an external A/D converter. The A/D converters convert the filtered crash acceleration signals into digital signals. The output of the A/D converters are filtered preferably using high-pass/low-pass filters having values empirically determined for the purpose of eliminating small drifts and offsets resulting from the conversion. In a microcomputer embodiment of the present invention, the filters would be digitally implemented within the microcomputer. The filtering functions provide filtered acceleration signals RAS_1X and RAS_1Y.

The controller 50 determines an acceleration value designated A_MA_RAS_1X from the sensor RAS_1X. This value is determined by calculating moving average values of the associated filtered acceleration signal from the side-satellite sensor 40. A moving average is a sum of the last predetermined number of samples of the filtered acceleration signal. The average is updated by removing the oldest value, replacing it with the latest sample, and then determining the new average.

The determined side-satellite sensor acceleration value A_MA_RAS_1X as a function of the determined displacement value Displ_Rel_1X is compared against an asymmetric RAS_1X threshold 220 in a threshold comparison function 226 of the controller 50. The threshold 220 varies as a function of Displ_Rel_1X in a predetermined manner to achieve the desired control. The threshold may be determined empirically for a particular vehicle platform of interest. The result of the comparison function 226 is output to an ORing function 230.

The side-satellite sensors 42 and 48 may be a single sensor assembly and provide signals RAS_2X and RAS_2Y, respectively, having characteristics (e.g., frequency and amplitude) indicative of the vehicle's crash acceleration in the X and Y directions, respectively, upon the occurrence of a crash event. The acceleration signal RAS_2X is filtered by, preferably, a hardware high-pass-filter ("HPF")/low pass filter ("LPF") 60 to eliminate frequencies resulting from extraneous vehicle operating events and/or inputs resulting from road noise. Similarly, the acceleration signal RAS_2Y is filtered by, preferably, a hardware high-pass-filter ("HPF")/low pass filter ("LPF") 64 to eliminate frequencies resulting from extraneous vehicle operating events and/or inputs resulting from road noise. The frequency components removed through filtering are those frequencies not indicative of the occurrence of a crash event. Empirical testing is used to establish a frequency range or ranges of the relevant crash signals so that extraneous signal components present in the crash acceleration signal can be filtered and frequencies indicative of a crash event passed for further processing.

The filtered output signals are provided to associated analog-to-digital ("A/D") converters that may be internal to the controller 50 (e.g., an A/D input of a microcomputer) or an external A/D converter. The A/D converters convert the filtered crash acceleration signals into digital signals. The output of the A/D converters are filtered preferably with high-pass/low-pass filters having filter values empirically determined for the purpose of eliminating small drifts and offsets resulting from the conversions. In a microcomputer embodiment of the present invention, the filters would be digitally implemented within the microcomputer. The filtering functions output filtered acceleration signals RAS_2X and RAS_2Y.

The controller 50 determines an acceleration value designated A_MA_RAS_2X from the sensor RAS_2X. This value is determined by calculating moving average values of the associated filtered acceleration signal from the side-satellite sensor 42. A moving average is a sum of the last predetermined number of samples of the filtered acceleration signal. The average is updated by removing the oldest value, replacing it with the latest sample, and then determining the new average.

The determined side-satellite sensor acceleration value A_MA_RAS_2X as a function of the determined displacement value Displ_Rel_1X is compared against an asymmetric RAS_2X threshold 250 in a threshold comparison function 256. The threshold 250 varies as a function of Displ_Rel_1X in a predetermined manner to achieve the desired control. The threshold may be determined empirically for a particular vehicle platform of interest. The result of the comparison function 256 is output to the ORing function 230.

With the ORing function 230, the controller 50 controls which threshold 130 or 132 is used to actuate the first stage deployment. If neither of the two determined values A_MA_RAS_1X OR A_MA_RAS_2X crosses their associated thresholds 220 (Asymmetric RAS_1X Segment) OR 250 (Asymmetric RAS_2X Segment), then threshold 130 is used. If any either of them crosses their associated thresholds, then the threshold 132 is used. The threshold 130 is also referred to herein as the Symmetric CCU $1^{st}$ Stage Threshold. The threshold 132 is also referred to herein as the Asymmetric CCU $1^{st}$ Stage Threshold.

Referring to FIG. 5, the logic control used by controller 50 is depicted to initiate a first stage deployment. As can be seen, if either RAS_1X OR RAS_2X $1^{st}$ stage segment values are exceed, a HIGH logic value will result from ORing function 230. The CCU_1X value is also determined whether the Vel_Rel_1X versus Displ_Rel_1X is outside of the misuse box shown in function 124 which defines values below which a no-deployment condition exists. Assuming CCU_1X values result in Vel and Disp values outside of the misuse box, i.e., the misuse box values are exceeded, AND CCU $1^{st}$ stage Asymmetric value has been exceeded or the CCU $1^{st}$ stage Symmetric CCU has been exceed by CCU_1X, the first stage 94 of the multistage air bag is deployed. Second stage deployment is based on the time for crossing the second threshold 134 and the inflator mapping shown in FIG. 6.

Figure 6:
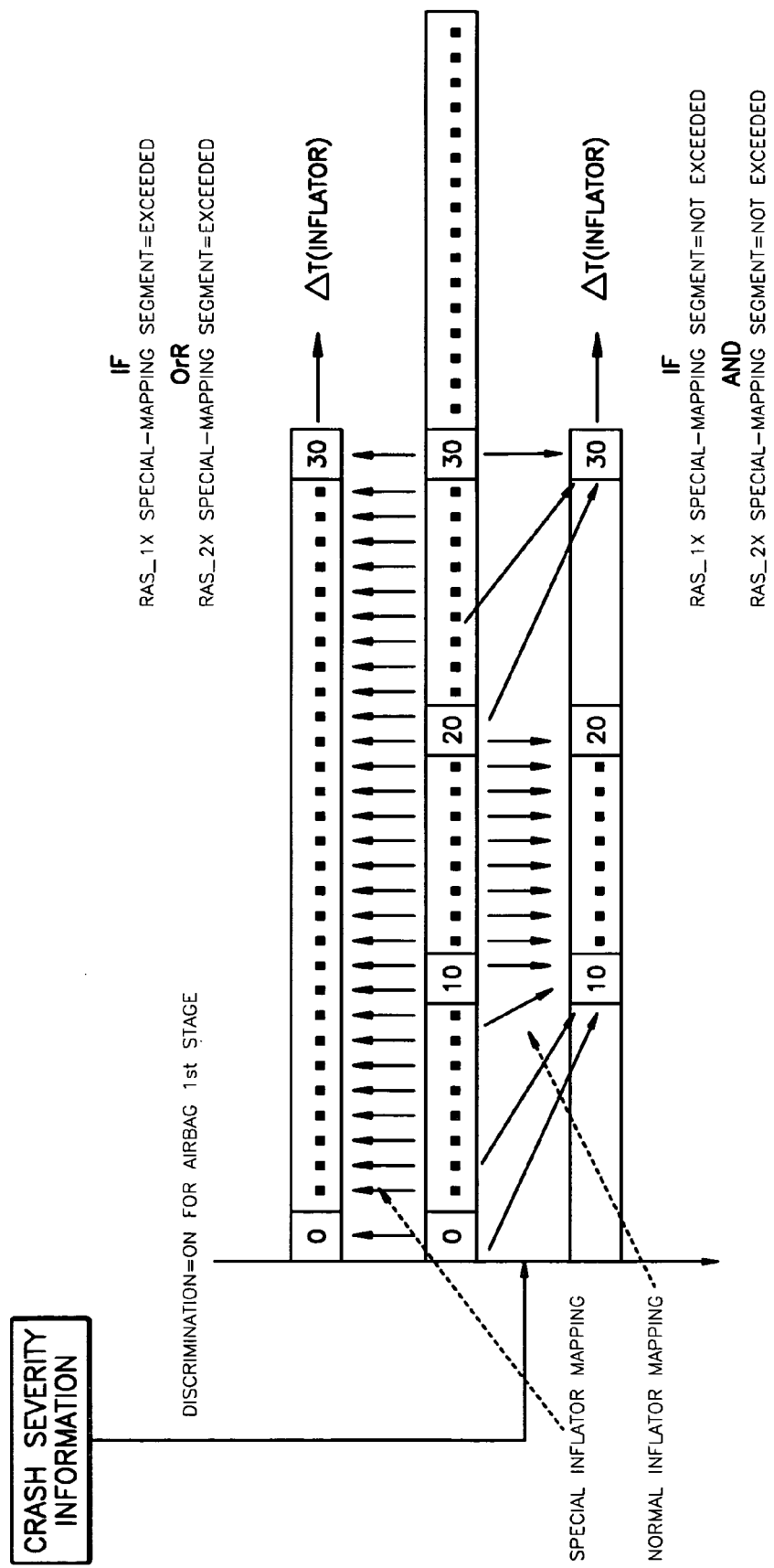
FIG. 6 is a diagram showing the inflator mapping in accordance with the present invention.

Referring to FIG. 6, mapping for control of second stage deployment is shown for an exemplary embodiment of the present invention. Two inflator mappings exist. A normal inflator map and a special inflator map. As to which map is used is controlled by the RAS_1X and RAS_2X values and the comparisons in functions 226 and 256. If both of the A_MA_CZS_1X and A_MA_CZS_2X values as a function of Disp_Rel_1X are below the special mapping thresholds 222 and 252, respectively, then the normal mapping is used. If either the A_MA_RAS_1X OR A_MA_RAS_2X values as a function of Disp_Rel_1X are greater than the special mapping thresholds 222 and 252, respectively, then the special mapping is used.

In the special-mapping, one-to-one timing occurs between the crossing of the second threshold and the deployment signal for the second actuation from 1-30 milliseconds. In the normal mapping, actuation of the second stage occurs 10 milliseconds after the first stage if the second threshold crossing was between 1-10 milliseconds of the first stage crossing, a one-to-one timing control between 10-20 milliseconds, and deployment 30 milliseconds after first deployment if the second crossing occurred between 21-30 milliseconds after the first stage deployment.

Other sensors 88 could be used to make further control adjustments. For example, if a rearward facing child seat is detected on the passenger's seat 84, actuation of the first and second stages 94, 96 could be prevented.

From the above description of the invention, those skilled in the art will perceive improvements, changes and modifications. Such improvements, changes, and/or modifications within the skill of the art are intended to be covered by the appended claims.

Having described the invention, the following is claimed:

1. An apparatus for controlling a vehicle actuatable occupant restraining system comprising:
   a central crash accelerometer sensing crash acceleration at a central vehicle location and providing a first crash acceleration signal indicative thereof;
   a side-satellite accelerometer sensing crash acceleration substantially parallel with a front-to-rear axis of the vehicle and for providing a side-satellite signal indicative thereof; and
   a controller actuating the actuatable occupant restraining system in response to the central crash acceleration signal and the side-satellite signal, wherein said controller determines a crash velocity value from said first crash acceleration signal and actuates said actuatable occupant restraining system as a first function of said crash velocity value when said side-satellite signal is at a first value and actuates said actuatable occupant restraining system as a second function of said crash velocity value when said side-satellite signal is at a second value.

2. The apparatus of claim 1 wherein said controller further determines a crash displacement value from said first crash acceleration signal and actuates said actuatable occupant restraining system as a first function of said crash velocity value as a function of crash displacement when said side-satellite signal as a function of the crash displacement value is at a first value and actuates said actuatable occupant restraining system as a second function of said crash velocity value as a function of crash displacement value when said signal from said side-satellite as a function of crash displacement value is at a second value.

3. The apparatus of claim 1 wherein said vehicle actuatable restraining system is a multistage occupant restraining device and said controller adjusts deployment criteria of actuation of a first stage of said multistage occupant restraining device in response to said side-satellite signal.

4. The apparatus of claim 1 wherein said side-satellite accelerometer is mounted in a vehicle side pillar.

5. The apparatus of claim 4 wherein said side-satellite accelerometer measures longitudinal acceleration.

6. The apparatus of claim 4 wherein said side-satellite accelerometer measures longitudinal and lateral acceleration.

7. An apparatus for controlling a vehicle actuatable occupant restraining system comprising:
   a central crash accelerometer sensing crash acceleration at a central vehicle location and providing a first crash acceleration signal indicative thereof;
   a XY side-satellite accelerometer mounted in a side structure of the vehicle for sensing crash accelerations and for providing XY side-satellite signals indicative thereof; and
   a controller actuating the actuatable occupant restraining system in response to the central crash acceleration signal and the XY side-satellite signals, wherein said controller determines a crash velocity value from said first crash acceleration signal and actuates said actuatable occupant restraining system as a first function of said crash velocity value when at least one of said XY side-satellite signals is at a first value and actuates said actuatable occupant restraining system as a second function of said crash velocity value when at least one of said XY side-satellite signals is at a second value.

8. The apparatus of claim 7 wherein said controller further determines a crash displacement value from said first crash acceleration signal and actuates said actuatable occupant restraining system as a first function of said crash velocity value as a function of crash displacement value when at least one of said XY side-satellite signals is at a first value as a function of said crash displacement value and actuates said actuatable occupant restraining system as a second function of said crash velocity value as a function of crash displacement when at least one of said XY side-satellite signals as a function of crash displacement is at a second value.

9. The apparatus of claim 7 wherein said vehicle actuatable restraining system is a multistage occupant restraining device and said controller adjusts deployment criteria of actuation of a first stage of said multistage occupant restraining device in response to said side-satellite accelerometer signal.

10. The apparatus of claim 7 wherein said side-satellite accelerometer is mounted in a vehicle side pillar.

11. An apparatus for controlling an actuatable occupant restraining system of a vehicle, the apparatus comprising:
   a first sensor located at a central vehicle location for sensing crash acceleration of the vehicle in a direction generally parallel to a longitudinal axis of the vehicle and providing first signals indicative thereof;
   a second sensor located remote from the first sensor and adjacent a side of the vehicle, the second sensor configured to sense crash acceleration in a direction generally parallel to a longitudinal axis of the vehicle and in a direction transverse to the longitudinal axis of the vehicle and to provide second signals indicative thereof; and
   a controller for actuating the actuatable occupant restraining system in response to the first and second signals, wherein said controller determines a crash velocity value and a crash displacement value from said first signal and actuates said actuatable occupant restraining system as a first function of said crash velocity value as a function of crash displacement when said signal from second sensor as a function of crash displacement is at a first value and actuates said actuatable occupant restraining system as a second function of said crash velocity value when said signal from said second sensor as a function of crash displacement is at a second value.

12. The apparatus of claim 11 wherein said vehicle actuatable restraining system is a multistage occupant restraining device and said controller adjusts deployment criteria of actuation of a first stage of said multistage occupant restraining device in response to said second signal.

13. The apparatus of claim 11 wherein said side-satellite accelerometer is mounted in a vehicle side pillar.

14. A method for controlling actuation of an actuatable occupant restraining system of a vehicle, the method comprising the steps of:
   sensing crash acceleration in a direction generally parallel to a longitudinal axis of the vehicle at a central vehicle location and providing first signals indicative thereof;
   sensing crash acceleration in a direction generally parallel to a longitudinal axis of the vehicle and in a direction transverse to the longitudinal axis of the vehicle at a location remote from the central vehicle location and adjacent a side of the vehicle and providing second signals indicative thereof;

determining a crash velocity value and a crash displacement value from said first crash acceleration signal; and actuating the actuatable occupant restraining system as a first function of said crash velocity value when said second signal at a first value and actuating said actuatable occupant restraining system as a second function of said crash velocity value when said second signal is at a second value.

15. A method for controlling a vehicle actuatable occupant restraining system comprising the steps of:

sensing forward crash acceleration at a central vehicle location;

sensing forward crash acceleration at a side location of the vehicle;

determining a crash velocity value and a crash displacement value from said sensed acceleration at the central location; and actuating the actuatable occupant restraining system as a first function of said crash velocity value when said signal from the side location is at a first value and actuating said actuatable occupant restraining system as a second function of said crash velocity value when said signal from the side location is at a second value.

* * * * *